United States Patent [19]
Strasser et al.

[11] Patent Number: 6,001,436
[45] Date of Patent: Dec. 14, 1999

[54] CERAMIC MATRIX COMPOSITE TURBOCHARGER HOUSING

[75] Inventors: Thomas Edward Strasser, Corona; Steven Donald Atmur, Riverside, both of Calif.

[73] Assignee: Northrop Grumman Corporation, Los Angeles, Calif.

[21] Appl. No.: 08/854,893

[22] Filed: May 12, 1997

[51] Int. Cl.⁶ .............................. B32B 5/12; C04B 35/80
[52] U.S. Cl. .................. 428/34.4; 428/293.4; 428/294.4; 60/323
[58] Field of Search .............................. 428/293.4, 294.4, 428/34.1, 34.4; 60/323

[56] References Cited

U.S. PATENT DOCUMENTS

| | | |
|---|---|---|
| 3,914,500 | 10/1975 | Brennan et al. .................. 428/294.4 X |
| 4,341,826 | 7/1982 | Prewo et al. . |
| 4,884,400 | 12/1989 | Tanaka et al. . |
| 4,972,674 | 11/1990 | Yamada et al. . |
| 5,018,661 | 5/1991 | Cyb . |
| 5,114,772 | 5/1992 | Vives et al. ....................... 428/293.4 X |
| 5,211,999 | 5/1993 | Okada .............................. 428/293.4 X |
| 5,254,397 | 10/1993 | Kawai et al. ......................... 428/293.4 |
| 5,488,017 | 1/1996 | Szweda et al. .................. 428/293.4 X |
| 5,632,320 | 5/1997 | Atmur et al. .............................. 164/98 |
| 5,738,818 | 4/1998 | Atmur et al. ............................ 264/624 |

*Primary Examiner*—Daniel Zirker
*Attorney, Agent, or Firm*—Terry J. Anderson; Karl J. Hoch, Jr.

[57] ABSTRACT

A heat-resistant, thermally insulative, ductile turbocharger housing for an internal combustion engine having a structure comprised at least partially of fiber reinforced ceramic matrix composite (FRCMC) material. The FRCMC material includes a polymer-derived ceramic resin in its ceramic form and fibers. The material, being for the most part ceramic, provides the heat-resistance and thermal insulating capabilities of the FRCMC material, while the fibers produce a desired degree of ductility in the FRCMC material.

14 Claims, 2 Drawing Sheets

CERAMIC MATRIX COMPOSITE TURBOCHARGER HOUSING

BACKGROUND OF THE INVENTION

1. Technical Field

This invention relates to a turbocharger housing for an internal combustion (IC) engine, and more particularly, to such a turbocharger housing formed of a fiber reinforced ceramic matrix composite (FRCMC) material and methods for making it.

2. Background Art

The power that can be developed by an internal combustion engine is dependent on the type of fuel used and how efficiently the fuel is burned. That, in turn, is dependent on the supply of air being provided to the cylinders being sufficient to cause as complete a combustion of the fuel as possible. By increasing the density of air to the cylinders of the engine the fuel can be burned efficiently, and as a result power is increased. The density of the air flow can be increased by using a turbocharger. A turbocharger is a device consisting of an engine exhaust operated turbine which drives a centrifugal compressor. The compressed air is mixed with fuel and provided to the cylinders during the intake stroke. Because the compressed air is more dense, it contains more oxygen and so facilitates a more complete combustion of the fuel.

FIG. 1 depicts a schematic of a turbocharged engine. The turbocharger is powered by the engine's exhaust gases being forced out of the engine by the exhaust stroke. Exhaust gases flow from the exhaust manifold 10, into the turbocharger turbine wheel 15 and out of the exhaust outlet 17. The turbocharger turbine wheel rotates the compressor wheel 14 via a shaft 11. Ambient air is drawn in the inlet 16 and is compressed by the compressor wheel 14. The compressed air is mixed with fuel and ultimately routed to the engine cylinder 13.

FIG. 2 provides a more detailed view of the turbocharger apparatus itself. Exhaust air is received from the exhaust gas inlet 28 and routed though an annular channel. The exhaust gas exits the channel and turns the turbine wheel 15 which turns the compressor wheel 14 via the shaft 11. Ambient air is sucked into the air inlet 16 and compressed by the compressor wheel 14. The compressed air is routed to the inlet manifold/cylinders (not shown) via the compressed air discharge outlet 22. A first turbocharger housing 32 covers the turbine wheel 24. Another turbocharger housing 36 covers the compressor wheel 20. Turbochargers operate not only under conditions of extreme heat but also under extreme variations in temperature. On the exhaust or input side of the turbocharger temperatures around 1500 degree F are common. On the output side, the air compressed by the compressor is typically 300 degree F. Hence, the turbocharger housing must withstand high temperatures and high temperature variation, especially on the exhaust.

Heretofore, various kinds of turbocharger housings for internal combustion engines have been employed. For instance, in racing applications, turbocharger housings have been constructed of light metals, such as thin wall stainless steel, to reduce weight.

Alternately, in designing turbocharger housings for the commercial industry, improved turbocharger efficiency and reduced underhood temperatures are required. Heat should ideally be conserved in the exhaust gas to get more efficient use of the turbocharger itself. Additionally, catalytic converters require hot exhaust gases in order to have efficient catalytic converter operation. Standard turbocharger housings are generally made of cast iron. Cast iron absorbs heat and cools the exhaust gases robbing energy which can be used to turn the turbine and precluding efficient catalytic converter operation. Specifically, cast iron has a substantial heat capacitance so that when the car is started up much of the energy from the exhaust gas goes to heating up the huge cold cast iron mass. Hence, turbine efficiency decreases and the exhaust air going to the catalytic converter is cold, impairing catalytic converter performance. As a result, presently there are very few turbochargers used on American automobiles. Additionally, cast iron has a relatively high coefficient of thermal expansion, which must be taken into account when considering design tolerances.

To prevent the common turbocharger housing problems, car, motorcycle, truck, train, and other machinery applications could utilize a better turbocharger housing than is provided by current technology. Depending on the application, this improved turbocharger housing should be constructed of material that is light, long wearing, and which has a low thermal expansion and low heat capacity, so as to conserve heat in the exhaust gases. This ensures a longer life and improved performance over the present technology.

Wherefore, it is an object of this invention to provide a lightweight, but high strength turbocharger housing which is ductile and fracture resistant.

Wherefore, it is an object of the present invention to provide an turbocharger housing which can be formed into complex shapes and sizes as desired.

It is still another object of this invention to provide a turbocharger housing that has improved insulation characteristics and lower thermal conductivity, to conserve heat in the exhaust gases and so enhance thermal efficiency and if applicable catalytic converter effectiveness.

Wherefore, it is another object of the present invention to provide a turbocharger housing which is capable of withstanding high temperatures and thermally-induced strains.

SUMMARY

The foregoing objects have been achieved by a strong, thermally insulating, ductile and fracture-resistant turbocharger housing, which is light weight and capable of withstanding high temperatures and thermally-induced strains. The low thermal conductivity enhances turbine efficiency and if applicable, catalytic converter effectiveness. The turbocharger housing is made of a structural fiber reinforced ceramic matrix composite (FRCMC) material. The FRCMC material includes a polymer-derived ceramic resin in its ceramic form and fibers. The material, being ceramic, provides the heat-resistance and thermal insulating capabilities of the FRCMC material, while the fibers produce a desired degree of ductility in the FRCMC material. Ductility for the purposes of the present invention is defined as the amount strain a sample of the FRCMC material can withstand before fracturing or tearing. The turbocharger housing has a snail shell-shaped channel surrounding a hollow central hub. The channel defines a passageway from an exhaust gas inlet to an opening connecting the passageway to the interior of the hub. The turbine wheel is housed within the hub and is driven by the exhaust gases of the engine.

Where reduced weight is the critical attribute, the turbocharger housing has a thin wall design, fabricated of a FRCMC material utilizing a woven ceramic fiber system in conjunction with a ceramic matrix. This imparts great strength for a given weight.

In systems where thermal conduction is the critical attribute, the turbocharger housing will be similar in design to a conventional thick wall cast iron housing. The thicker FRCMC provides improved insulation because the thicker walls result in more heat being retained by the exhaust gas flowing through the housing, thus increasing the efficiency of the turbine. Additionally, retaining exhaust gas heat improves the operation and efficiency of any attached catalytic converter. The fabrication technique for this type of unit can utilize a short fiber compression molding, injection molding or resin transfer molding approach.

Forming a turbocharger housing of FRCMC material has significant advantages over the prior cast iron or stainless steel turbocharger housings. First, FRCMC material can be formed into practically any shape and size desired. This allows a FRCMC turbocharger housing to be made in large or small complex shapes. FRCMC material being ductile makes the turbocharger housing fracture resistant and capable of withstanding thermally-induced strains which may be imparted to the liner when employed in an internal combustion engine. Additionally, the FRCMC material, especially if comprised of a woven fiber, is very strong for a given weight. Thick-walled turbochargers manufactured of FRCMC materials have improved insulation characteristics than conventional materials used to fabricate such housings, which enhances turbine efficiency, and if applicable catalytic converter effectiveness.

The polymer-derived ceramic resin used to form the FRCMC material is preferably either silicon-carboxyl resin or alumina silicate resin, and the fibers are preferably at least one of alumina; one of the Nextel series materials such as Nextel 312, Nextel 440, Nextel 510, or Nextel 550 manufactured by the 3M Corporation; silicon nitride; silicon carbide; HPZ; graphite; carbon; and peat. The aforementioned degree of ductility caused by the fibers varies with the percentage by volume of the fibers in the FRCMC material. Preferably, there is a sufficient quantity of fibers to produce the desired degree of ductility. Specifically, the percentage by volume of the FRCMC material consisting of the fibers is within a range of about 20 to 55 percent, which will produce a degree of ductility between about 0.15 percent and 0.55 percent strain to failure. In addition, the form of the fibers incorporated into the FRCMC material has either a continuous configuration or a non-continuous configuration wherein the fiber form also affects the degree of ductility exhibited. Preferably, the fiber form employed is chosen to, in combination with the quantity of fibers, produce the desired degree of ductility. The fibers are also preferably coated with an interface material which increases the ductility exhibited by the FRCMC material so as to facilitate producing the desire degree of ductility. Specifically, the interface material preferably includes at least one 0.1–0.5 micron thick layer of at least one of carbon, silicon nitride, silicon carbide, and boron nitride. The FRCMC material can also further incorporate a filler material which increases the hardness of the material. Specifically, the filler material can include one or more of the following: alumina, silicon carbide, silicon nitride and silica. The degree of hardness added by the filler material varies with the percentage by volume of the structure consisting of the filler material. Accordingly, a sufficient quantity of filler material should be incorporated to produce the desired degree of hardness. Preferably, the percentage by volume of the FRCMC material consisting of the filler material is within a range of about 10 to 25 percent.

The thick-walled embodiment of the turbocharger housing of the present invention is preferably formed by an injection molding process using non-continuous "chopped" fibers. This produces a turbocharger having thermally insulating characteristics. If weight is a factor (such as in racing applications), a thin-wall embodiment can be employed. This embodiment has continuous woven fibers to achieve a high degree of ductility for its weight. A thin-wall embodiment is preferably made using a resin transfer molding (RTM) process.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention. The structure of the turbocharger housing; the materials of which the turbocharger housing may be made; tailoring specifics and methods of making the turbocharger housing will be discussed in turn.

Figure 1:
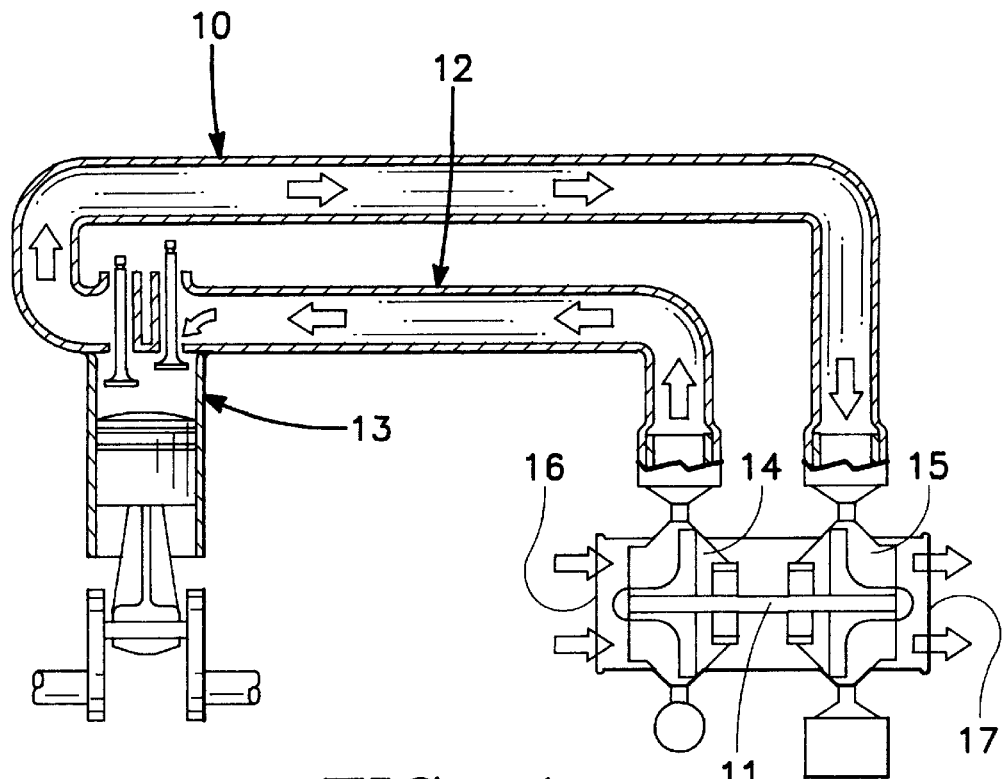
FIG. 1 is a schematic of a turbocharged internal combustion engine.
Figure 2:
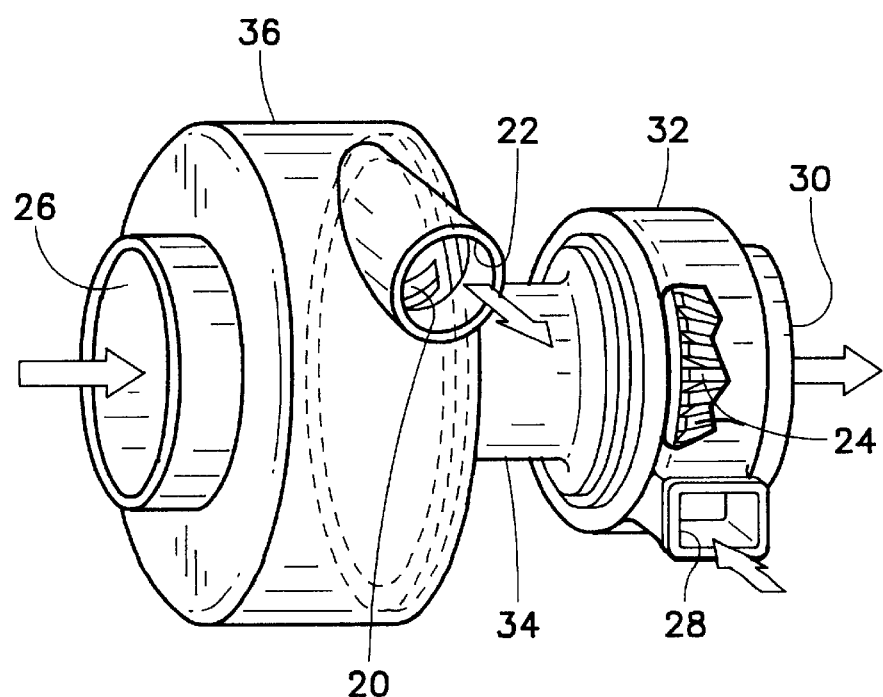
FIG. 2 is a diagram of a turbocharger unit.
Figure 3:
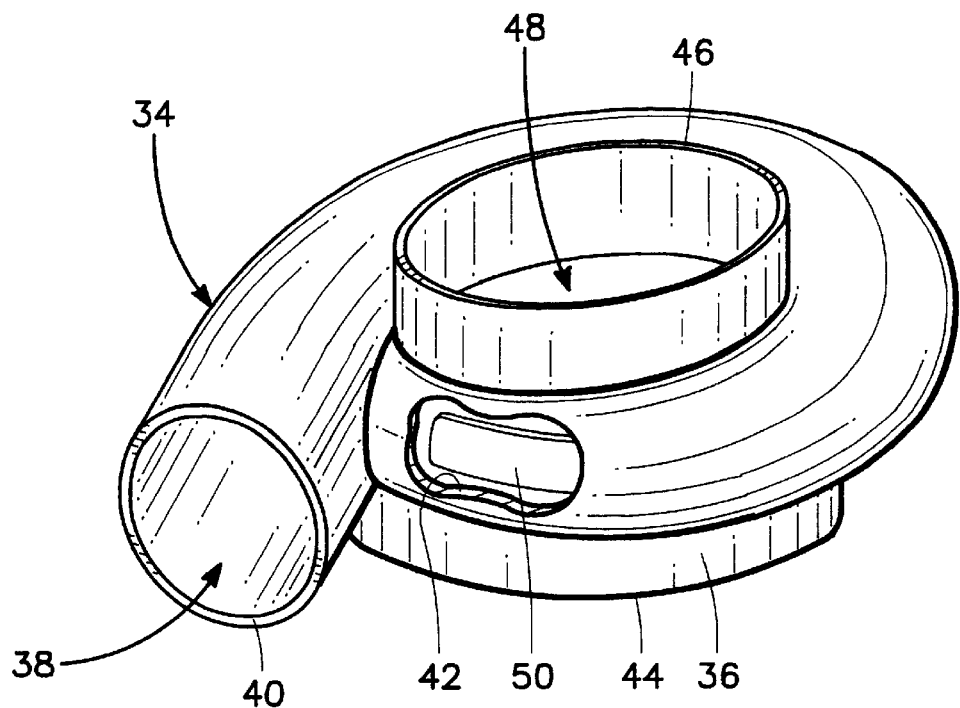
FIG. 3 is a front view of the turbocharger housing of the present invention.
Figure 4:
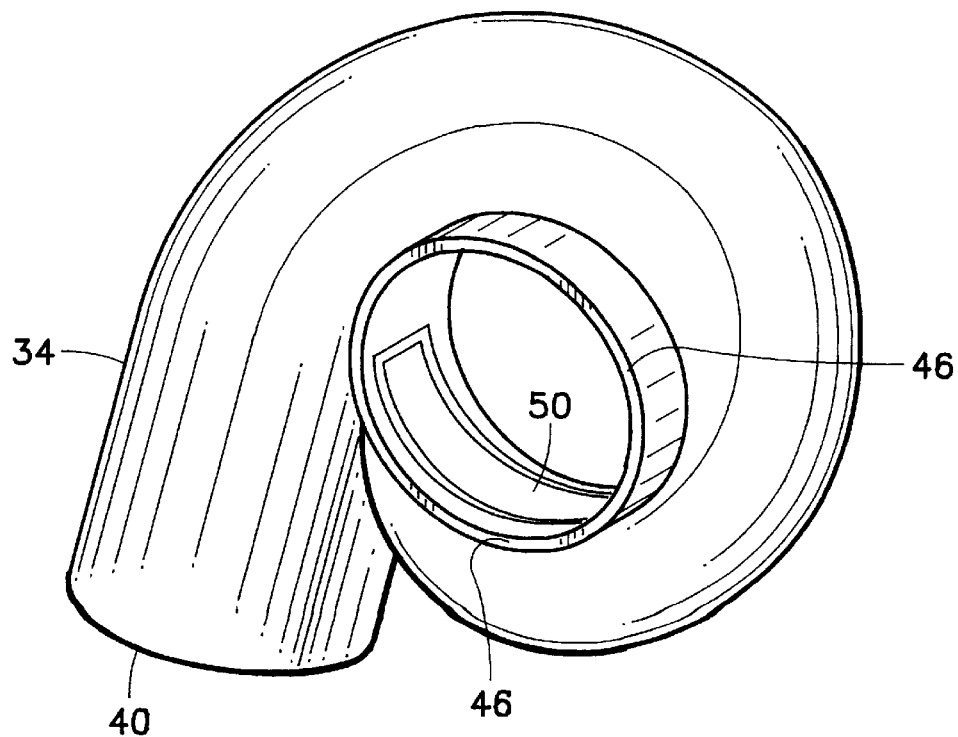
FIG. 4 is a side view of the turbocharger housing of the present invention.

Structure:

FIGS. 3 and 4 depict an embodiment of a turbocharger housing 32 in according with the present invention. In this embodiment, the housing 32 has a snail shell-shaped passageway 38 formed by a similarly shaped channel 34. The channel 34 begins at the exhaust gas inlet 40 and wraps around a central hub 36. The cross-sectional area of the passageway 38 at the exhaust gas inlet 40 is preferably larger than at the passageway's termination point 42 adjacent the central hub 36. Further, it is preferred that the cross-sectional area gradually decrease from the inlet 40 to the termination point 42. The channel 34 depicted in FIGS. 3 and 4 has a circular cross-section. However, this need not be the case. For example, the cross-section could be oval, square, or rectangular in shape.

The central hub 36 has a cylindrical shape and forms a cavity 48 large enough to accommodate the exhaust turbine (not shown). The cavity preferably has a larger cross-sectional area at the exhaust gas outlet 44, than at the opposite side 46 which connects to the other sections of the turbocharger. In addition, it is crucial that the dimensions of the cavity 48 adjacent the periphery of the exhaust turbine be tightly controlled so as to provide a minimal clearance to prevent leakage and ensure the free rotation of the exhaust turbine.

An opening 50 connects the passageway 38 of the channel 34 with the interior of the hub 36. Exhaust gases flow through the passageway 38 from the inlet 40, to the opening 50, where gas flows into the cavity 48 and turns the turbine (not shown).

Where reduced weight is the critical requirement, the turbocharger housing channel 34 may have a thin wall, similar to a thin wall stainless steel casting, but fabricated of a FRCMC material utilizing a woven fiber system. This structure imparts great strength for its light weight but does not have as great an insulative capacity as a thick walled structure, although it is still an improvement over current metal housings.

In systems where thermal conductivity is the critical requirement such as in diesel or gasoline engine applications for motor vehicles, the turbocharger housing will be similar in design to a conventional thick wall cast iron housing. The thicker channel wall of this housing would provide improved insulation, thereby retaining more heat in the exhaust gas and so increasing the efficiency of the turbine. Additionally, retaining more heat in the exhaust gases improves the operation and efficiency of any attached catalytic converter. The fabrication technique for this type of unit would preferably utilize a short fiber injection molding approach as will be described later. It is noted that the appropriate thickness to provide the desired insulative effect can be readily determined using well known methods by determining the thermal conductivity of the particular type of FRCMC material employed for the turbocharger housing 32 and computing the thickness necessary to achieve the desired degree of insulation for the internal combustion engine being adapted with turbocharger housing according to the present invention. For example, for most applications it is believed a wall thickness between about 0.2 inches and 0.5 inches will provide an adequate insulative effect using a thermal conductivity of approximately 6.1 W/m° C.

Materials:

Materials appropriate for use in forming the FRCMC walls of the turbocharger housing of the present invention are generally are made by combining a pre-ceramic polymer resin, such as silicon-carboxyl resin sold by Allied Signal under the trademark BLACKGLAS™ or alumina silicate resin (commercially available through Applied Poleramics under the product description C02), with some type of fibers. Examples of types of fibers which might be employed in an FRCMC material include alumina; Altex; one of the Nextel series materials such as Nextel 312, Nextel 440, Nextel 510, Nextel 550 manufactured by the 3M Corporation; silicon nitride; silicon carbide; HPZ; graphite; carbon; and peat. The fibers can be supplied in the form of rigid or binderized preforms, woven or braided preforms, random mat preforms, fabric, tow (thread), or chopped tow or fabric. Typically, the method of forming the FRCMC layers will dictate which form or forms of fibers appropriate for the process. Examples of some appropriate methods of forming the FRCMC layers will be described later in this disclosure. To add toughness to the material, the fibers being incorporated into the FRCMC layers are preferably first coated to a thickness of approximately 0.1 to 0.5 microns with an interface material such as carbon, silicon nitride, silicon carbide, silicon carboxide, boron nitride or multiple layers of one or more of these interfacial materials. The interface material prevents the resin from adhering directly to the fibers of the fiber system. Thus, after the resin has been converted to a ceramic, there is a weak interface between the ceramic matrix and the fibers. This weak bond enhances the ductility exhibited by the FRCMC material. In addition, the FRCMC material can include filler materials preferably in the form of powders having particle sizes somewhere between about 1 and 100 microns. These filler material can include one or more of the following materials: alumina, silicon carbide, silicon nitride and silica. The resin, fiber, and possibly filler material mixture is generally formed into the shape of the desired structure via one of a variety of methods and heated for a time to a temperature, as specified by the material suppliers. For example, in the case of BLACK-GLAS™ silicon-carboxyl resin, the mixture is typically heated to 350° F. to cure the resin and form a pre-ceramic polymer composite. This pre-ceramic polymer composite structure is then heated to a temperature of between 1,500° F. and 2,000° F. to pyrolize the polymer and form a ceramic composite.

Tailoring for Specific Properties:

The fibers and interface materials incorporated into the FRCMC material provide ductility to the FRCMC structure. Ductility is the measure of how much strain the structure can withstand before fracturing or tearing. This ductility gives the FRCMC structure the strength to withstand the rigors of general handling and thermally-induced strains associated with the widely varying temperature environment of an internal combustion engine employing a turbocharger. However, the degree of ductility necessary to prevent a failure of the FRCMC structure will vary depending on the type of engine involved and the particular application in which it is to be employed. Thus, it can be desirable to tailor the degree of ductility exhibited by the FRCMC material. The tailoring process is a subject of a patent application entitled CERAMIC COMPOSITE MATERIALS HAVING TAILORED PHYSICAL PROPERTIES, having the same inventors as the present application and assigned to a common assignee. This application has a filing date of Oct. 14, 1998, and is assigned Ser. No. 09/172,361.

An example of tailoring the ductility of the FRCMC material used in a turbocharger housing in accordance with the present invention is shown by the case where enough fibers to make up between about 25 to 55 percent of the volume of the structure are incorporated. This amount of fiber produces a ductility within a range of about 0.10 to 0.55 percent strain, where the lower the fiber volume is within the range, the lower the resulting ductility. The types of fibers which can be employed to produce the desired degree of ductility are any of those mentioned previously, or any combination of those fibers.

Another characteristic of the FRCMC material which is of interest in the design of the turbocharger housing is the thermal conductivity exhibited by the material. The thermal conductivity can also be tailored to some extent by the choice of fibers.

Generally, the above-described tailoring involves incorporating the appropriate type of fibers into the composite in sufficient quantities to produce the desired degree of a characteristic, such as the exhibited ductility and/or thermal conductivity. In both cases, the degree to which these respective characteristics are exhibited varies with the type and percent by volume of fibers incorporated into the structure. In addition, the ductility exhibited by a FRCMC material can also be tailored by selecting the form of the fibers. Namely, selecting either a continuous or a non-continuous configuration. A continuous fiber configuration corresponds to woven fiber systems where the individual fibers typically run the entire length of the FRCMC structure. Whereas, non-continuous fiber configurations are associated with loose fibers which often terminate within the structure itself. Fibers in a continuous fiber configuration will produce a higher degree of ductility than will a non-continuous fiber configuration. Finally, it is noted that the choice of interface material can have an effect on the degree of ductility exhibited by the FRCMC material.

However, there can be a tradeoff involved in the tailoring process. Generally, the greater the amount of some types of fibers in the FRCMC material, the greater its thermal conductivity (e.g. carbon fibers). If it is desired to limit the thermal conductivity to a desired level, this can be accomplished by restricting the amount of fibers making up the FRCMC material. This will, of course, also limit the degree of ductility that can be imparted to the composite by the fibers. However, if the amount of fibers incorporated into the FRCMC material has to be limited in order to achieve a desired thermal conductivity to the point that the necessary ductility would not be achieved, the ductility can still be enhanced by choosing the form of the fibers and the interface materials which will produce the maximum degree of ductility. In this way, it may be possible to obtain both the desired thermal conductivity and ductility using the same amount of fibers. If the approach is taken to select the type of fibers which will ensure the desired degree of ductility, the impact of the type of fibers on the thermal conductivity of the composite must also be considered in choosing the fibers. Generally, the use of ceramic fibers will minimize the thermal conductivity of the FRCMC material, as opposed to, for example, carbon fibers which would tend to increase the thermal conductivity. Thus, it is preferred that ceramic fibers be chosen when it is desired to both enhance the ductility and to minimize thermal conductivity.

The hardness of the FRCMC material is also important to the durability of the turbocharger housing and can be tailored by the addition of an appropriate filler material. Filler materials suitable for increasing the hardness of the FRCMC material include one or more of the following: alumina, silicon carbide, silicon nitride and silica. The degree of hardness added by the filler material varies with the percentage by volume of the structure consisting of the filler material. Accordingly, a sufficient quantity of filler material should be incorporated to produce the desired degree of hardness. Preferably, the percentage by volume of the FRCMC material consisting of the filler material is within a range of about 10 to 25 percent.

Method of Manufacture:

The turbocharger housings of the present invention can be fabricated by using various methods. Injection molding and resin transfer molding (RTM) are discussed below.

A. Injection Molding: The preferred method for forming the thick-wall embodiment of the turbocharger housing according to the present invention is by injection molding because this method is more conducive to mass production. For the turbocharger housing fabricated by this method, fiber lengths would be on the order of between about 0.5 and 5.0 inches, depending on the complexity of the part. As described below, injection molding generally entails the steps of:

(a) Injecting a quantity of bulk molding compound into a cavity of a mold using the methods and an injection apparatus as disclosed in a co-pending application entitled COMPRESSION/INJECTION MOLDING OF POLYMER-DERIVED FIBER REINFORCED CERAMIC MATRIX COMPOSITE MATERIALS having some of the same inventors as the present application and assigned to a common assignee. This co-pending application was filed on Feb. 28, 1996 and assigned Ser. No. 08/704,348, now issued as U.S. Pat. No. 5,738,818. co-pending application is herein incorporated by reference. The aforementioned bulk molding compound is a mixture which includes the above-described pre-ceramic resin, non-continuous "chopped" fibers, and possibly filler materials.

(b) Heating the mold at a temperature and for a time associated with the pre-ceramic resin which polymerizes the resin to form a fiber-reinforced polymer composite structure.

(c) Removing the polymerized composite structure from the mold.

(d) Removing a mandrel employed to form the interior of the turbocharger housing by dissolving the mandrel if it is of a washout type, or melting it if it is of the melt-out type.

(e) And, heating the polymerized composite structure at a temperature and for a time associated with the polymerized resin which pyrolizes it to form a FRCMC structure.

Once the FRCMC part is molded via the injection molding process, it is preferred that an additional procedure be performed to eliminate pores created during the required heating cycles. Eliminating these pores strengthens the part. Specifically, after the completion of the heating step which pyrolizes the FRCMC part, the part is immersed into a bath of a pre-ceramic resin to fill the pores. The part is then heated at a temperature and for a time associated with the resin filling said pores so as to transform it to a ceramic material. Unfortunately, the process of heating the resin filling the pores will create further pores. Accordingly, it is desired that the filling and heating steps be repeated until the pore density within the FRCMC part is less than a prescribed percentage by volume. This prescribed percentage corresponds to the point where the part will exhibit a repeatable strength from one part to the next. It is believed five iterations of the filling and firing process are required to obtain this repeatable part strength. To facilitate the filling step, it is preferred that the resin has a water-like viscosity. In addition, the FRCMC part could be placed in a vacuum environment to assist in the filling of the pores.

A mold which can be used to form the thick-wall embodiment of a FRCMC turbocharger housing by the above-described injection molding method would employ a curved snail shell-shaped mandrel having an exterior surface corresponding to the dimensions of the interior of surfaces of the channel (34 of FIGS. 3 and 4). The mandrel is either a "wash-out" or "melt-out" (for example one made of wax or plastic) structure. The wash-out type mandrel is removed after the housing has been polymerized and extracted from the mold by dissolving it via conventional methods, such as with a high pressure water jet. A melt-out type mandrel, on the other hand, is removed once the housing has been pyrolized and extracted from the mold by melting it. In addition, this mandrel could include a central plug having the dimensions of the hub cavity. Two side portions surround the mandrel and have an internal surface corresponding to the dimensions of the exterior surface of the turbocharger housing being formed. These side pieces could also form the central hub cavity, rather than employing a portion of the mandrel, if desired. In summary, the mold and mandrel define the mold's internal volume which has the shape of the turbocharger housing being formed. The mold's internal volume is connected by a series of sprue channels to an inlet which interfaces with the injection molding apparatus. The mold also contains a series of resin outlet ports to allow excess resin to escape during the molding process.

B. Resin Transfer Molding: The above-described injection molding method requires that the fibers included in the bulk molding compound be in the form of chopped fibers, i.e. non-continuous. However, the continuous, woven fiber configuration can provide a greater degree of strength to the FRCMC material. Therefore, if a woven form of fibers is employed to achieve the desired ductility and thinner wall thickness as in racing applications, the injection molding method cannot be employed. In this case, it is preferred that a resin transfer molding (RTM) process be used, as described in a co-pending application entitled METHODS AND APPARATUS FOR MAKING CERAMIC MATRIX COMPOSITE LINED AUTOMOBILE PARTS AND FIBER REINFORCED CERAMIC MATRIX COMPOSITE AUTOMOBILE PARTS by the inventors herein and assigned to the common assignee of the present application. This co-pending application was filed on Aug. 16, 1995 and assigned Ser. No. 08/515,849, now issued as U.S. Pat. No. 5,632,320, now issued at U.S. Pat. No. 5.623,320. The disclosure of this co-pending application is incorporated by reference. The RTM method described in the co-pending application generally involves forming a woven fiber preform in the shape of the part from loose fibers or from a piece of woven fiber fabric; placing the preform in a cavity of a mold having the shape of the turbocharger housing; forcing a liquid pre-ceramic polymer resin through the cavity to fill the cavity and saturate the preform; heating the mold at a temperature and for a time associated with the pre-ceramic polymer resin which transforms the liquid pre-ceramic polymer resin-saturated preform into a polymer composite part; removing the polymer composite part from the mold; removing a mandrel employed to form the interior of the turbocharger housing by dissolving the mandrel if it is of a washout type, or melting it if it is of the melt-out type; and, firing the polymer composite part in a controlled atmosphere at a temperature and for a time associated with the pre-ceramic polymer which transforms it into a ceramic, whereby the polymer composite part is transformed into a fiber reinforced ceramic matrix composite turbocharger housing.

The same mold described above in connection with injection molding method can be employed in the RTM process. However, the molds are used in a different way. The woven fiber preform having the thickness of the internal chamber is slipped over the mandrel prior to assembling the mold. This preform has a thickness corresponding to the internal chambers of the mold. In addition, the inlet to the sprue channels of the mold is connected to a reservoir containing pre-ceramic resin, rather than to an injection apparatus. And finally, the outlet associated with the resin outlet ports of both molds is connected to a vacuum source.

With the preform in place, the vacuum source is activated for creating a vacuum and the path to the resin reservoir is opened. Resin under pressure is forced into the mold and through the preform from the combined pressure and the vacuum from the vacuum source until the preform is totally saturated with the resin.

The turbocharger housing components can also be fabricated using other well known methods applicable to FRCMC part formation including hot pressing, tape or tow placement, or hand lay-up. However, it is not intended to limit the invention to any of the described methods. Rather any appropriate method may be employed to form the turbocharger housing components from the previously described FRCMC material.

Because it has qualities that conventional turbocharger housing components do not have such as heat and fracture-resistance under extreme temperatures, light weight, and high strength, the turbocharger housing components made from above-described FRCMC material have several advantages. The FRCMC turbocharger components are relatively light compared to conventional turbocharger housing materials such as cast iron or thin wall stainless steel, and hence require less energy to accelerate and decelerate the machine. Additionally, the FRCMC turbocharger housing assembly provides high thermal insulation to reduce underhood temperatures and more efficiently operate with catalytic converters. Also, the FRCMC turbocharger components are harder than presently used turbocharger housings, and thereby increase the life of the turbocharger assembly. Additionally, the FRCMC turbocharger housing exhibits a lower thermal expansion and thus can be manufactured to closer tolerances. Also, wheel tolerances get tighter at operating temperatures, which is not true for the metal counterparts.

While the invention has been described in detail by specific reference to preferred embodiments thereof, it is understood that variations and modifications thereof may be made without departing from the true spirit and scope of the invention. For example, turbocharger housing shapes other than the snail-shaped embodiment may be formed. Any conventional turbocharger housing shape would lend itself to being made by the present invention.

Wherefore, having thus described the present invention, what is claimed is:

1. A heat-resistant, thermally insulative, ductile turbocharger housing for an internal combustion engine, comprising:
   a structure comprised at least partially of fiber reinforced ceramic matrix composite (FRCMC) material comprising a polymer-derived ceramic resin in its ceramic form and fibers coated with an interface material for enhancement of ductility of said material.

2. The turbocharger housing of claim 1 wherein the polymer-derived ceramic resin is chosen from silicon-carboxyl resin and alumina silicate resin.

3. The turbocharger housing of claim 1 wherein the fibers comprise at least one of alumina, Nextel 312, Nextel 440, Nextel 510, Nextel 550, silicon nitride, silicon carbide, HPZ, graphite, carbon, and peat.

4. The turbocharger housing of claim 1, wherein the degree of ductility caused by the fibers varies with the percentage by volume of the fibers in the FRCMC material, and wherein there is a sufficient quantity of fibers to produce the desired degree of ductility.

5. The turbocharger housing of claim 4, wherein the percentage by volume of the FRCMC material consisting of the fibers is within a range of about 25 to 55 percent, so as to produce a degree of ductility between about 0.10 to 0.55 percent strain.

6. The turbocharger housing of claim 4, wherein the form of the fibers incorporated into the FRCMC material has either a continuous configuration or a non-continuous configuration, said fiber form also affecting the degree of ductility exhibited, and wherein the fiber form employed is chosen to, in combination with the quantity of fibers, produce the desired degree of ductility.

7. The turbocharger housing of claim 1 wherein the interface material comprises at least one 0.1–0.5 micron thick layer chosen from the group consisting of carbon, silicon nitride, silicon carbide, and boron nitride.

8. The turbocharger housing of claim 1, wherein the FRCMC material further comprises a filler material which increases the hardness of the material.

9. The turbocharger housing of claim 8, wherein the filler material is chosen from the group consisting of alumina, silicon carbide, silicon nitride, silica, and mixtures thereof.

10. The turbocharger housing of claim 9, wherein the degree of hardness provided by the filler material varies with the percentage by volume of the structure consisting of the filler material, and wherein there is a sufficient quantity of filler material to produce a desired degree of hardness.

11. The turbocharger housing of claim 1 wherein said structure comprises a snail shell-shaped channel surrounding a hollow central hub, said channel defining a passageway from an exhaust gas inlet to an opening connecting the passageway to the interior of the hub.

12. The turbocharger housing of claim 11 wherein said channel has a circular cross-section.

13. The turbocharger housing of claim 11 wherein said channel has a thin wall comprising a fiber reinforced ceramic matrix composite material with a continuous woven fiber configuration.

14. The turbocharger housing of claim 12 wherein said channel has a thick wall comprised of a fiber reinforced ceramic matrix composite material with a non-continuous chopped fiber configuration.

* * * * *